United States Patent [19]
Anderlik et al.

[11] Patent Number: 5,953,129
[45] Date of Patent: Sep. 14, 1999

[54] METHOD AND A DEVICE FOR THE CONTINUOUS COLORIMETRY OF PLASTICS MOLDING COMPOUNDS

[75] Inventors: Rainer Anderlik, Heidelberg; Jürgen Ettmüller, Hassloch; Matthias Rädle, Weisenheim; Paulus Schmaus, Ludwigshafen; Norbert Mödersheim, Frankenthal, all of Germany

[73] Assignee: BASF Aktiengesellschaft, Ludwigshafen, Germany

[21] Appl. No.: 08/882,730

[22] Filed: Jun. 26, 1997

[30] Foreign Application Priority Data

Jul. 3, 1996 [DE] Germany ............... 196 26 785

[51] Int. Cl.$^6$ ........................................ G01J 3/46
[52] U.S. Cl. ................................................ 356/402
[58] Field of Search .................... 356/326, 402–411, 356/301, 300, 432, 436, 440; 250/227.11–227.32; 385/12, 13, 15, 31, 39, 138, 139, 902

[56] References Cited

U.S. PATENT DOCUMENTS

| | | |
|---|---|---|
| 4,033,668 | 7/1977 | Presby . |
| 4,573,761 | 3/1986 | McLachlan . |
| 5,369,483 | 11/1994 | Wilson . |
| 5,657,404 | 8/1997 | Buchanan et al. . |

FOREIGN PATENT DOCUMENTS

| | | |
|---|---|---|
| 072 899 | 3/1983 | European Pat. Off. . |
| 407 927 | 1/1991 | European Pat. Off. . |

OTHER PUBLICATIONS

Patent Abst. of Japan, vol. 18, No. 194 (p–1722), 1994 (JP 6 3276).
Patent Abst. of Japan, vol. 18, No. 302 (m–1618), 1994 (JP 6 64021).
Patent Abst. of Japan, vol. 18, No. 243 (m–1602), 1994 (JP 6 31793).
Patent Abst. of Japan, vol. 18, No. 133 (m–1571), 1994 (JP 5 318560).
Patent Abst. of Japan, vol. 17, No. 8 (m–1350), 1993 (JP 4 239623).

Primary Examiner—K P Hantis
Attorney, Agent, or Firm—Keil & Weinkauf

[57] ABSTRACT

A method for the continuous colorimetry of plastics molding compounds, which involves light being introduced, via transmitter light pipes and a sensor head, into the melt of the molding compound and the light reflected there being passed, via receiver light pipes, to a spectrometer or multi-range photometer, conjugate transmitter and receiver light pipes in each case being spaced equidistantly.

28 Claims, 3 Drawing Sheets

METHOD AND A DEVICE FOR THE CONTINUOUS COLORIMETRY OF PLASTICS MOLDING COMPOUNDS

The invention relates to a method and a device for the continuous colorimetry of plastics molding compounds, which involves light being introduced, via transmitter light pipes and a sensor head, into the melt of the molding compound and the light reflected there being passed, via receiver light pipes, to a spectrometer or multirange photometer. In the case of such molding compounds, colorants such as pigments or dye concentrates and, where required, further additives such as dispersing aids are admixed to the uncolored plastics bulk stream and homogenized in a suitable compounding unit, for example a corotating tightly intermeshing twin-screw extruder. In an ensuing process step the colored plastics molding compound is granulated.

BACKGROUND OF THE INVENTION

In the case of known methods a sample of granules is taken from the product stream generated and in a subsequent step is processed so as to yield a molding which is subjected to the actual color measurement with the aid of spectroscopic methods. This procedure entails a considerable delay between the production of the colored granules and the quality-assuring color test on the molding. If deviations in the color do occur, considerable quantities of faulty batches are produced before the deviation in color can be recognized and suitable countermeasures can be taken. If production is enabled only after a molding specimen has been tested, this will result in machine downtimes which are uneconomical.

This is why in-line measuring methods had indeed been developed earlier, which indicate the hue without any delay. Thus EP 0 407 927 previously described a method for the continuous measurement of the hue of a colored plastics molding compound, involving the characterization of plastics granules in terms of their hue when they pass a measuring window. This method suffers from the drawback of the concomitant reflections. There is also the possibility of the measurement result being affected by moisture deriving from the granulating process. U.S. Pat. No. 5,369,483 further describes a method for measuring the hue of a plastics molding compound, wherein the scattered light of a plastics melt is analyzed by means of a glass fiber bundle. This method suffers from the drawback of the low long-term stability of commercial fiber bundles. Moreover, the geometry of the parts in contact with the product is unfavorable in principle, since the generally viscous melts will result only in low exchange, of product at the measuring surface. Another adverse factor is that the illuminated surface is within the range visible to the detector and that consequently minute, unavoidable contamination may lead to considerable measurement errors. EP 072 899, finally, discloses a photometric measuring device which employs a backscattering technique. However, the results achieved here are not optimal in terms of the specific applications aimed for in the present invention.

BRIEF SUMMARY OF THE INVENTION

It is an object of the invention to provide a method and a device with which any changes of a color of a plastics melt can be ascertained extremely quickly and reliably and the color can be corrected without any delay.

This object is achieved according to the invention by conjugate transmitter and receiver light pipes in each case being spaced equidistantly. This can be achieved by transmitter and receiver light pipes each being made of glass fibers which are sheathed by a layer of quartz, which is sheathed by a layer of plastic. For the sheathing of the layer of quartz preferably also a layer of metal, preferably of gold, may be used. This metallic layer is preferably vapor deposited. In this arrangement it is particularly advantageous for the diameters of the glass fibers to be identical. Moreover, it is particularly advantageous for the thickness of the sheath of each glass fiber to be identical. Surprisingly we found that such a configuration of a glass fiber cable, comprising conjugate transmitter and receiver light pipes which are spaced equidistantly owing to the identical layer thickness of the sheath, permits extraordinarily sensitive measurements. Essentially this is due to the emitted light rays reaching the receiver light pipe not directly but only after multiple reflection in the melt. This multiplies the reflection effect. The glass fibers may have a diameter of from 50 $\mu$m to 800 $\mu$m, is preferably from 150 $\mu$m to 250 $\mu$m. The spacing of the glass fibers is advantageously between 20 $\mu$m and 1400 $\mu$m, preferably between 50 $\mu$m and 150 $\mu$m.

It is particularly advantageous for the light passed through the transmitter light pipe to have wavelengths from a wide spectrum, with the option of light in the wavelength range of from 200 $\mu$m to 2400 $\mu$m being introduced into the transmitter light pipe. Moreover, it is particularly advantageous for the method according to the invention if the intensity of all the wavelengths of the reflected light is measured simultaneously. In this context the measuring time may be in the range <4 msec, preferably in a range of about 0.5 msec.

Particularly advantageously, in terms of using the novel method, the sensor head into which the glass fibers are run projects into the melt. At the same time, said sensor head should have a low flow resistance, which can be achieved by it having a conical shape. Particularly for reasons of stability it is advantageous to sheath the glass fibers with a layer of quartz and the latter with a layer of metal, particularly of gold. This can be done by vapor deposition. The metallic layer can be connected metallically, preferably by soldering to the sensor head which is at least inside metallic.

The novel method can be used particularly advantageously for quality inspection and quality assurance of plastics coloring processes, in particular for formula optimization of pigment preparations.

According to an advantageous embodiment of the invention, the sensor head is mounted in a sleeve which is provided with an external thread and can be screwed into a thread provided in a container for the plastics molding compound. This thread can also be used for screwing in other measuring devices.

BRIEF DESCRIPTION OF THE DRAWING

Further details and advantages of the invention can be gathered from the illustrative embodiments depicted in the drawing, in which.

DETAILED DESCRIPTION OF THE INVENTION

Figure 1:
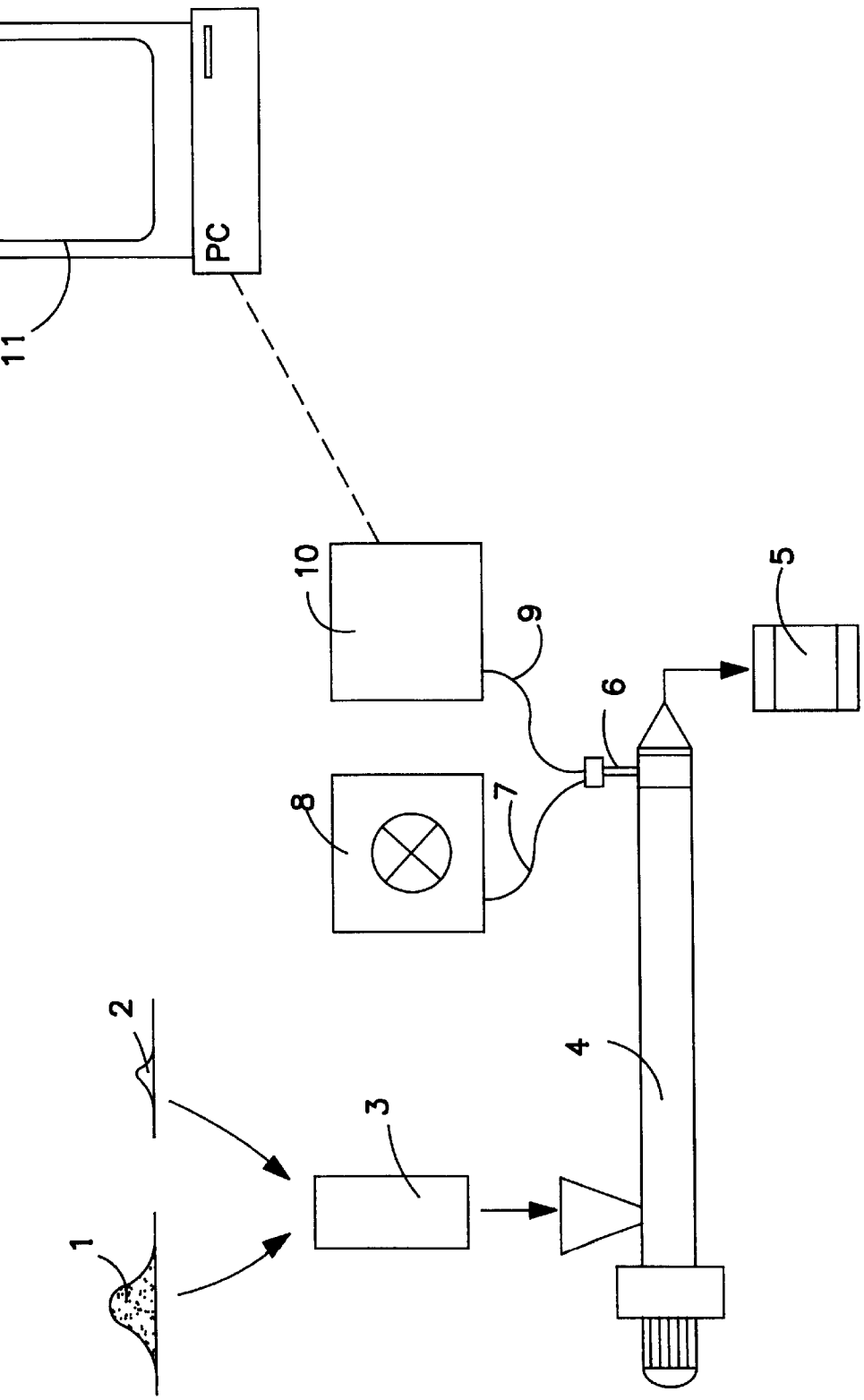
FIG. 1 shows the general schematic of an arrangement which can be used to implement the novel method.

As can be seen in FIG. 1, uncolored plastics granules 1 as well as granules (masterbatch) 2 with a high colorant content are fed to a mixer 3 whence they pass into a corotating tightly intermeshing twin-screw extruder 4, where the granules are homogenized and, in the process, heated to above the melting temperature. The resulting product in the form of extrudates is then passed to a collecting vessel 5. Protruding into the extruder is the sensor head 6, which is screwed into a thread in the extruder and in which the transmitter and receiver light pipes 7, 9 end. The transmitter light pipe 7 is connected to the light source 8, and the receiver light pipe 9 connected to the spectrometer 10. The pulses received from the spectrometer 10 are passed to an analyzer unit 11.

Figure 2:
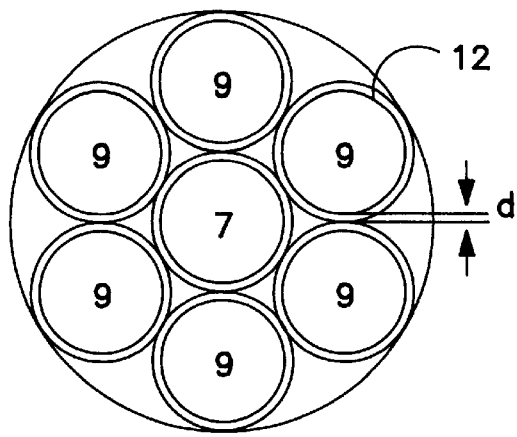
FIG. 2 shows a cross section through a light pipe arrangement according to the invention.

In the case of the light pipe element shown in cross section in FIG. 2, a single transmitter light pipe 7 is envisaged, arranged centrally. Around it six receiver light pipes 9 are arranged whose sheaths 12 lie against one another. The external diameter of the entire light pipe element, which can also be referred to as a fiber optics cable, is 960 $\mu$m, the glass fibers 7 and 9 each having a diameter of 250 $\mu$m. Their sheaths each have a thickness d of 35 $\mu$m. This wall thickness d of the sheath is composed of an inert quartz sheath having a thickness of 20 $\mu$m and a plastic layer applied thereonto, for example polyimide, having a thickness of 15 $\mu$m. Instead of polyimide preferably a vapor deposited metallic layer may be used, preferably a gold layer. This allows a metallic connection of the transmitter light pipes 7 and 9 with the sensor head 9 preferably by soldering. By this way a substantially higher stability can be achieved.

Figure 3:
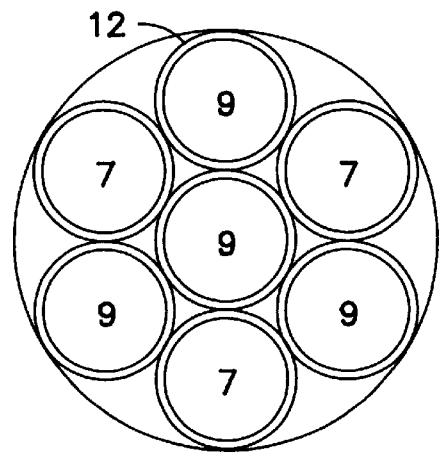
FIG. 3 shows a light pipe arrangement corresponding to FIG. 2, with modifications.

FIG. 3 shows a modified embodiment of the configuration of the light pipe element, where the external light pipes are alternately transmitter light pipes 7 and receiver light pipes 9.

Figure 4:
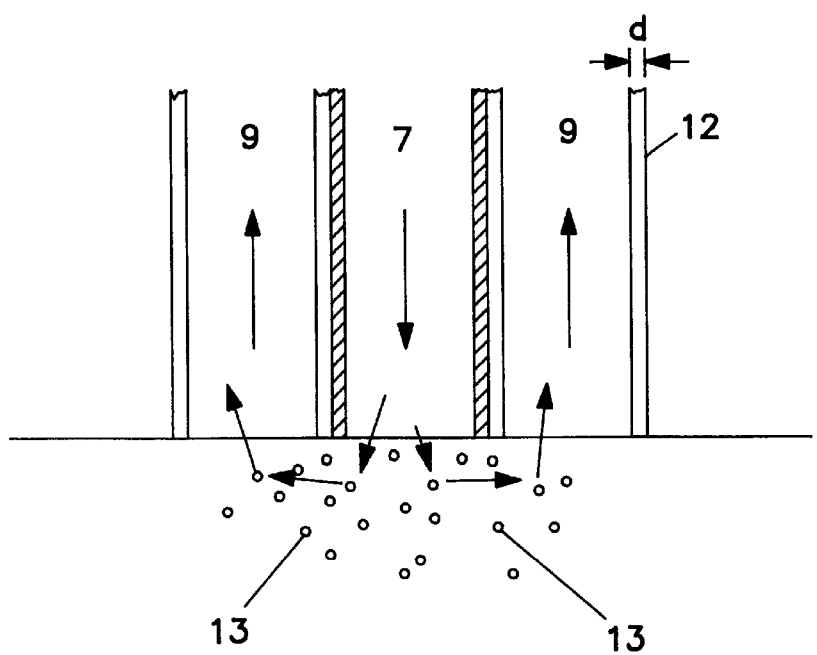
FIG. 4 shows a longitudinal section through the light pipe arrangement according to FIG. 2.

FIG. 4 shows, in longitudinal section, how the light supplied via the transmitter light pipe 7 is multiply scattered by the particles 13 and is then, via the receiver light pipe 9, passed to the spectrometer 10.

Figure 5:
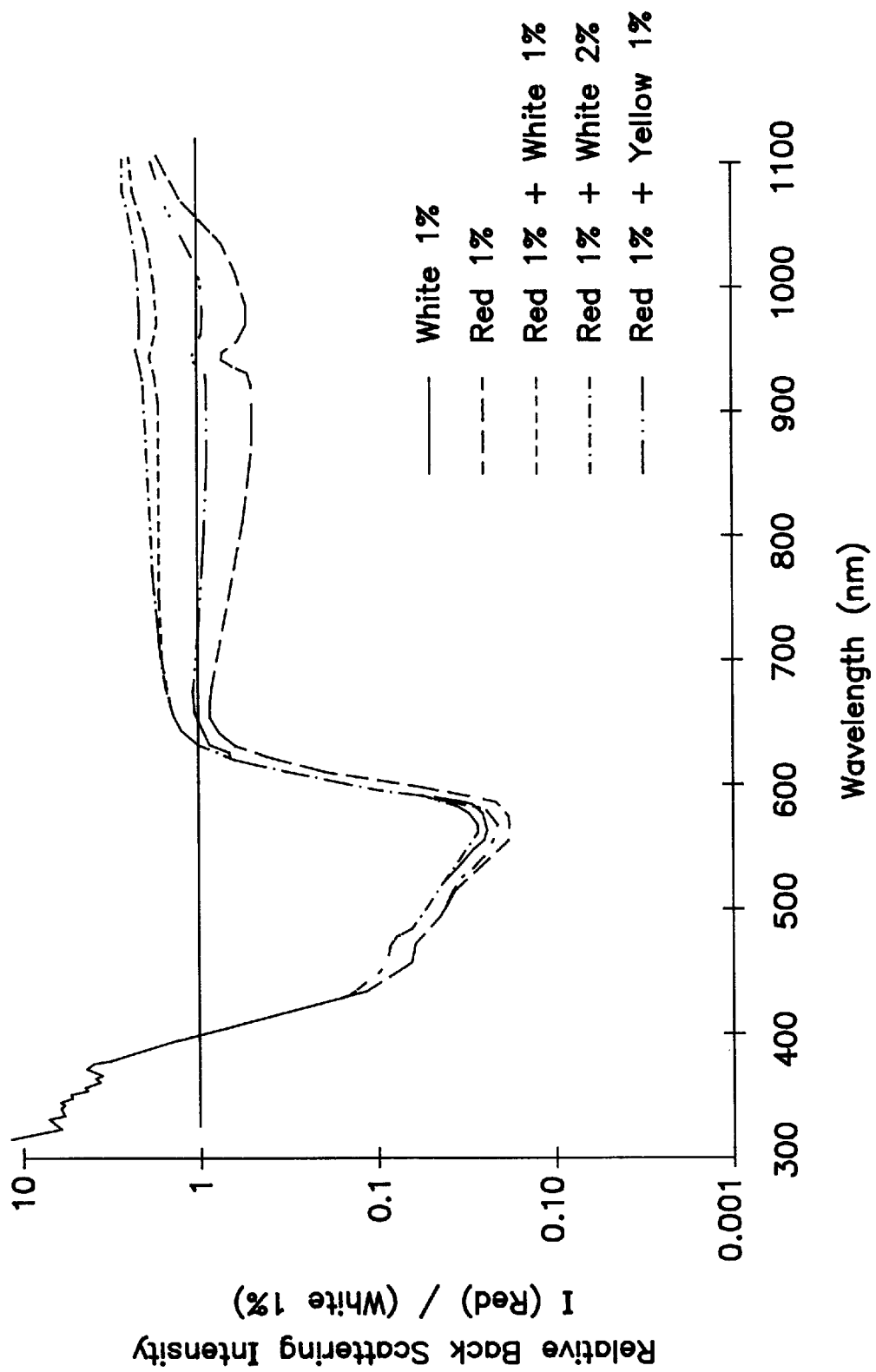
FIG. 5 shows the measurement results obtained in experiments with a light pipe arrangement according to FIGS. 2 and 4.

The results of experiments which were carried out in accordance with the novel method using the above-described arrangement are shown in FIG. 5. The data represented there were recorded in a plastic melt. This involved, initially, 1 wt % of white pigment being dosed into clear melt and being run through the extruder. The corresponding backscatter was defined as the standard and set to 1=100%. Then red pigment was dosed in instead of the white, and the quasi-backscatter was recorded spectrally. This, as can be seen, results in drastic changes in signal, depending on the wavelength, up to a factor of 100. Subsequently, various doses of pigment powders were added, which all show that these variations in colorant concentration give rise to drastic signal effects. In conjunction with the possible measurement accuracy of less than 1% rel. this resulted in a very high measurement accuracy and thus dosing accuracy for coloring melts.

The measurements were recorded for 300–1100 nm. They illustrate that in addition to measurements in the visible range the NIR and the UV region also become accessible.

We claim:

1. A method for the continuous colorimetry of plastics molding compounds, which involves light being introduced, via transmitter light pipes and a sensor head, into the melt of the molding compound and the light reflected there being passed, via receiver light pipes, to a spectrometer or multirange photo-meter, wherein conjugate transmitter and receiver light pipes in leach case are spaced equidistantly; wherein transmitter and receiver light pipes each comprise glass fibers which are sheathed by a layer of quartz and the latter is sheathed by a layer of plastic or metal; and wherein the glass fibers have a diameter of from 50 to 800 $\mu$m; and wherein the spacing of the glass fibers is from 20 to 1400 $\mu$m.

2. A method as claimed in claim 1, wherein transmitter and receiver light pipes each comprise glass fibers which are sheathed by a layer of quartz and latter is sheathed by a layer of gold.

3. A method as claimed in claim 2, wherein the metal, particularly the gold, is vapor deposited.

4. A method as claimed in claim 1, wherein the diameter of the glass fibers is identical.

5. A method as claimed in claim 1, wherein the thickness of the sheath of the glass fibers is identical.

6. A method as claimed in claim 1, wherein the light passed through the transmitter light pipe comprises wavelengths from a wide spectrum.

7. A method as claimed in claim 6, wherein light in the wavelength range of 200 nm–2400 nm is introduced into the transmitter light pipes.

8. A method as claimed in claim 6, wherein the intensity of all the wavelengths of the reflected light is measured simultaneously.

9. A method as claimed in claim 8, wherein the measuring time is in the range below 100 msec, preferably in the range of about 5 msec.

10. A method as claimed in claim 1, wherein the sensor head adjoining the glass fibers projects into the melt.

11. A method as claimed in claim 10, wherein the sensor head has a low flow resistance.

12. A method as claimed in claim 11, wherein the sensor head is conical in shape.

13. A method as claimed in claim 2 in which transmitter light pipes are connected to the sensor head metallically.

14. A method as claimed in claim 13 wherein the transmitter light pipes are soldered to the sensor head.

15. The use of the method as claimed in claim 1 for quality inspection and quality assurance of plastics coloring processes.

16. The use of the method as claimed in claim 1 for formula optimization of pigment preparations.

17. The method of claim 1, wherein the glass fibers have a diameter of from 150 to 250 $\mu$m and a spacing of from 50 to 150 $\mu$m.

18. A device for the continuous colorimetry of plastics molding compounds, which involves light being introduced, via transmitter light pipes and a sensor head, into the melt of the molding compound and the light reflected there being passed, via the sensor head and receiver light pipes, to a spectrometer or multirange photo-meter, wherein conjugate transmitter and receiver light pipes in each case are spaced equidistantly; wherein the transmitter and receiver light pipes each comprise one glass fiber which is sheathed by a layer of quartz and the latter is sheathed by a layer of plastic or metal; wherein the glass fibers have a diameter of from 50 to 800 $\mu$m; and wherein the spacing of the glass fibers is from 20 to 1400 $\mu$m.

19. A device as claimed in claim 18, wherein the transmitter and receiver light pipes each comprise one glass fiber which is sheathed by a layer of quartz and the latter is sheathed by a layer of gold.

20. A device as claimed in claim 19, wherein the metal, particularly the gold, is vapor deposited.

21. A device as claimed in claim 18, wherein the diameter of the glass fibers is identical.

22. A device as claimed in claim 18, wherein the thickness of the sheath of the glass fibers is identical.

23. A device as claimed in claim 18, wherein the sensor head adjoining the glass fibers projects into an instrument through which the melt is flowing.

24. A device as claimed in claim 23, wherein the sensor head is conical in shape.

25. The device as claimed in claim 23, wherein the sensor head has an external thread which can be screwed into a thread into the instrument through which the melt is flowing.

26. A device as claimed in claim 19, wherein the transmitter light pipes are metallically connected to the sensor head.

27. A device as claimed in claim 26, wherein the transmitter light pipes are soldered to the sensor head.

28. The device of claim 18, wherein the glass fibers have a diameter of from 150 to 250 $\mu$m; and a spacing of from 50 to 105 $\mu$m.

* * * * *

UNITED STATES PATENT AND TRADEMARK OFFICE
CERTIFICATE OF CORRECTION

PATENT NO.: 5,953,129

DATED: September 14, 1999

INVENTOR(S): ANDERLIK et al.

It is certified that error appears in the above-identified patent and that said Letters Patent is hereby corrected as shown below:

Col. 4, claim 1, line 2, delete "leach" and substitute --each--.

Col. 4, claim 2, line 11, after " and" insert --the--.

Signed and Sealed this

Ninth Day of May, 2000

Attest:

Attesting Officer

Q. TODD DICKINSON

Director of Patents and Trademarks